UNITED STATES PATENT OFFICE.

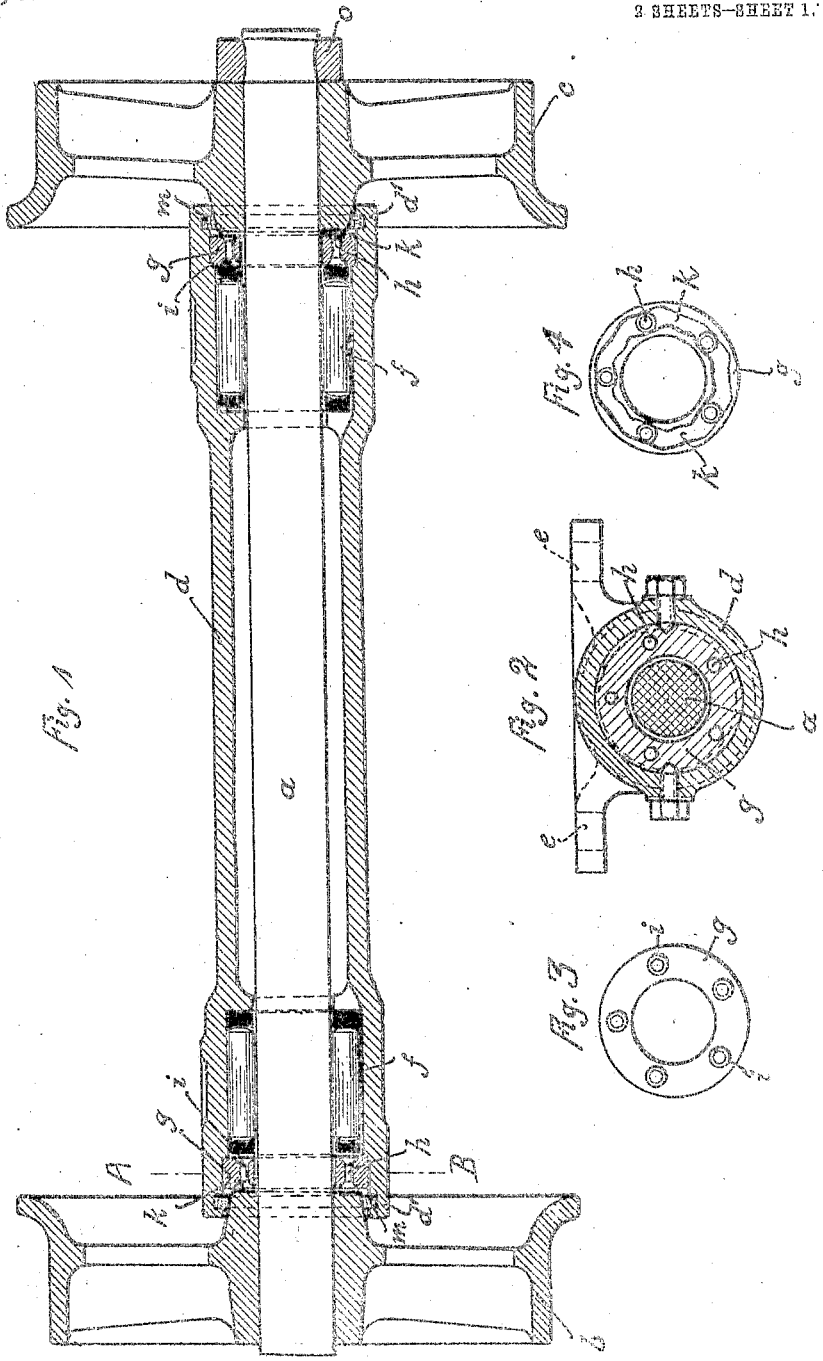

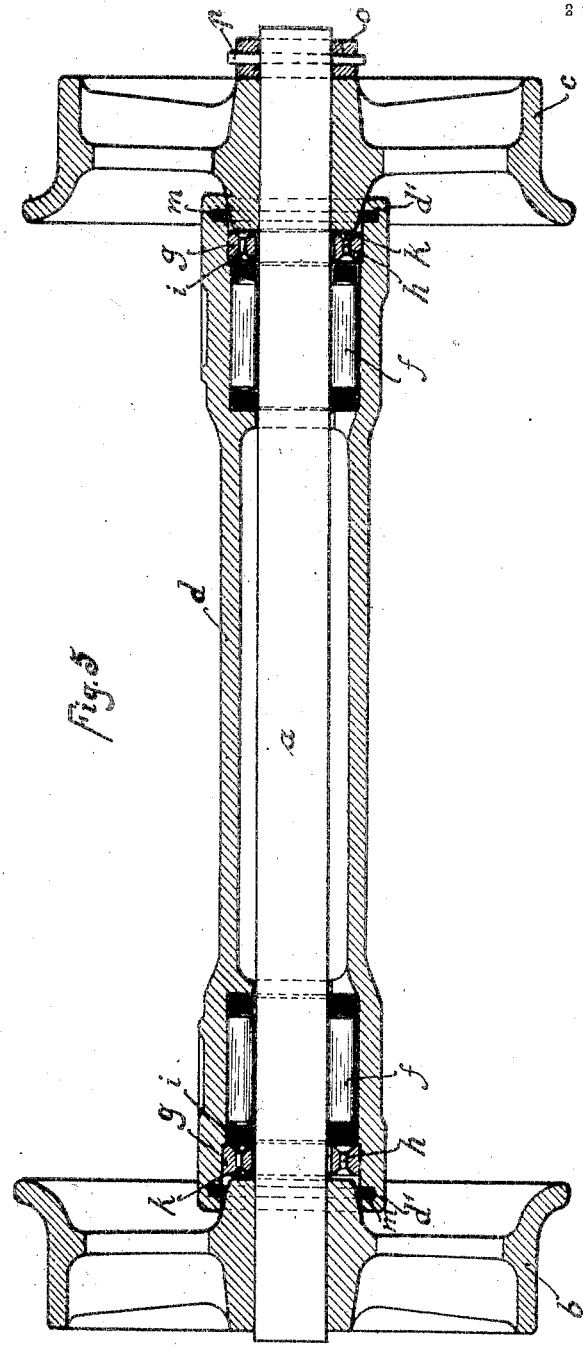

AUGUST LEONHARDT AND LOUIS BÖNNINGER, OF GELSENKIRCHEN, GERMANY, ASSIGNORS TO GELSENKIRCHENER GUSSTAHL-U. EISENWERKE VORMALS MUNSCHEID & CO., OF GELSENKIRCHEN, GERMANY, A CORPORATION OF GERMANY.

AXLE WITH A PAIR OF WHEELS IN WAGON-AXLE BOXES.

1,116,451.      Specification of Letters Patent.      Patented Nov. 10, 1914.

Application filed April 21, 1914. Serial No. 833,352.

*To all whom it may concern:*

Be it known that we, AUGUST LEONHARDT and LOUIS BÖNNINGER, citizens of the German Empire, and residing at Gelsenkirchen, Germany, have invented certain new and useful Improvements in Axles with a Pair of Wheels in Wagon-Axle Boxes, of which the following is a specification.

The subject of our invention is the axle with a pair of wheels for colliery or mining wagons, field-railway wagons and the like. It is distinguished by a construction by means of which easy running and small wear and a reliable junction of the individual parts are obtained so that the assembled members do not become loosened by the severe jerks and blows to which such pairs of wheels and axles are exposed.

To this end our improved construction comprises an axle, a wheel turning therewith and preferably shrunk or pressed thereon, a loose wheel turning on the said axle but not turning with it, a tubular lubricating bushing or box free to turn on said axle between said wheels, and a ring fast on said axle outside of the loose wheel above mentioned, said ring being preferably provided with a convex inner face adapted to fit a corresponding groove in said axle and shrunk or pressed into engagement with the same, shrinking or pressing being equivalent procedures to effect such fastening. When said loose wheel is to be removed the ring is wrenched off. Any method of attachment allowing easier removal, but normally holding said ring fast (for example a split pin key bayonet joint or screw threads) would still ordinarily enable it to keep said loose wheel in place, also it would avoid the necessity of disturbing any other part in removing said wheel and therefore would come within the scope of my invention; but when the ring is attached so as to prohibit removal except by wrenching off it is more certain to fulfil in all circumstances its functions of holding in place the loose wheel and the tubular part between the wheels.

To these ends, our invention consists in the construction, arrangement and combination of parts described hereinafter and pointed out in the claims.

One illustrative embodiment of our invention and a modification thereof is represented by way of example in the accompanying drawing, wherein:

Figure 1 is a horizontal section, and Fig. 2 is a cross-section, taken on the line A—B in Fig. 1 showing one form of our improved junction of the wheels and axle, Figs. 3 and 4 show a lubricating ring arranged between the bearing of the axle and the hub of the wheel, and Fig. 5 shows a modified form in horizontal section.

Referring firstly to Figs. 1 to 4, the one end of the axle $a$ has pressed or shrunk on to it a wheel $b$ so that it is fast on the axle and rotates therewith; a wheel $c$ is free to rotate on the other end of the axle. Between these two wheels is a tubular lubricating bushing or box $d$ which surrounds the axle and is provided with lugs $e$ (Fig. 2) for carrying the body of the wagon. The bushing is filled through a hole, not shown, closable by a screw, with a lubricant, preferably grease. Each end of the bushing $d$ is provided with a roller bearing $f$ comprising one roller cage. Instead of roller bearings also ball bearings may be provided. A ring $g$ is inserted between each roller bearing and the adjacent periphery of the hub of the wheel; this ring has a number of transverse holes $h$ which enlarge on the side facing the roller cage into recesses $i$ and open on the side facing the hub of the wheel into a lubricating groove $k$. The purpose of this ring is to collect the lubricant issuing from the adjacent bearing of the axle into the recesses $i$; the suction action arising from the rotating end face of the hub of the wheel then sucks this lubricant through the holes $h$ and it is uniformly distributed by the groove $k$ over the end face of the hub of the wheel; consequently this face receives an abundant and well distributed supply of lubricant, whereby friction and wear of the end of the hub is materially diminished. In order to close the end of the lubricating bushing we insert between the neck $d'$ and the periphery of the hub a ring of felt $m$ in the annular chamber or space between the neck of the bushing and the hub. Outside the hub of the loose wheel $c$ is shrunk on the end of the axle a disk $o$; in order that this disk may be firmly positioned, as shown in Fig. 1 the axle $a$ is preferably turned slightly concave at this place; instead of this arrangement, however, it might be provided at this place with small ribs into which the material of the disk $o$ enters when being shrunk on. Instead of shrinking the disk $o$ on the axle it may be pressed on cold, in which case, of course, there is no special shape at this place of the axle. The disk $o$ prevents the loose wheel $c$ sliding off the axle and is so arranged that there is only a minimum amount of clearance or play between the hub of the wheels and the inner parts of the lubricating box. If a wheel or a bearing has to be exchanged the disk $o$ can be readily wrenched off. Owing to the one wheel being attached by shrinking or pressing it on the axle and to the closure disk being likewise attached by shrinking or pressing it on the other end we provide that the parts or members which are intended to remain firmly connected with the axle do not become loose in the course of time and even when subjected to rough usage.

If it is desired that the pair of wheels and axle shall not be dismembered by wrenching off the described end disk or ring the latter may be pushed on to the end of the axle and secured by a split pin, cotter, key or bayonet joint, or it may be screwed and locked thereon. Fig. 5 shows an embodiment in which the disk or ring $o$ is placed loose on the end of the axle and secured by a cotter or key $p$.

We claim—

1. A vehicle axle, in combination with a wheel fast on one end thereof, another wheel loose on the other end of said axle, a tubular part loose on said axle and occupying the space between the wheels and a disk shrunk on the end of said axle outside of said loose wheel to hold the aforesaid loose parts in place.

2. A vehicle axle, in combination with a wheel fast thereon, a wheel loose thereon, a part filling the space between them and means on said axle outside of said loose wheel for holding the latter in position, the removal of said means permitting the removal of said loose wheel without disturbing any other element.

3. A vehicle axle, in combination with a wheel fast thereon, a wheel loose thereon, a part filling the space between said wheels on said axle and a ring fast on said axle outside of said loose wheel for holding the latter in position, the removal of said ring permitting the removal of said loose wheel without disturbing any other element.

4. A vehicle axle, in combination with a wheel fast thereon, a wheel loose thereon, a tubular part loose on said axle and filling the space between the said wheels and a ring fast on said axle outside of said loose wheel and serving to hold the latter and said tubular part securely in position, the removal of said ring permitting the removal of said loose wheel without disturbing any other element.

5. A pair of wheels and axle for pit wagons, field railway wagons and the like, comprising in combination, an axle, a wheel shrunk on one end thereof, a loose wheel free to rotate on the other end of the axle, a tubular lubricating box or bushing located between said wheels and mounted by roller bearings on the axle, and a distance ring shrunk on the end of the axle outside and adjacent to the said loose wheel.

6. A vehicle axle in combination with a wheel fast on one end thereof, another wheel loose on said axle, a tubular part occupying the space between the wheels, roller bearings between said tubular part and said axle and a disk fast on the end of said axle outside of said loose wheel, to hold the aforesaid loose parts in place.

7. A vehicle axle, in combination with a wheel fast on one end thereof, another wheel loose on the other end of said axle, an intervening part occupying the space between said wheels and having roller bearings between it and said axle and means on said axle, outside of said loose wheel, for keeping said loose wheel in place.

8. A vehicle axle, in combination with a fast wheel and a loose wheel thereon, a part filling the space between them, roller bearings between said axle and said part, and means for holding said loose wheel against displacement.

9. A pair of wheels and axle for pit wagons, field railway wagons and the like, comprising in combination an axle, a wheel fast on one end of the axle, a loose wheel free to rotate on the other end of the axle, a tubular lubricating bushing or box mounted on roller bearings on the axle between the said wheels, and a distance ring shrunk on the end of the axle outside and adjacent to said loose wheel.

10. A pair of wheels and axle for pit wagons, field railway wagons and the like, comprising in combination an axle a wheel shrunk on one end thereof, a second wheel free to rotate on the other end of the axle, a tubular lubricating bushing or box mounted on roller bearings on the axle between the said wheels, and a distance ring shrunk on the axle adjacent to the second wheel and outside the same on the end of the axle.

11. A pair of wheels and axle for pit wagons, field railway wagons and the like, comons, field railway wagons and the like, comon one end thereof, a second wheel free to rotate on the other end of the axle, a tubular lubricating bushing or box mounted on roller bearings on the axle between said wheels, and a distance ring attached adjacent to said second wheel outside the same on the end of the axle, the said axle being provided with a concave annular recess at this point and the said ring having a correspondingly convex inner face which fits into said recess to lock said ring on said axle.

12. A vehicle axle, in combination with a wheel fast on one end thereof, another wheel loose on the other end of said axle, a tubular part loose on said axle and occupying the space between the wheels and a disk fast on the end of said axle outside of said loose wheel to hold the aforesaid loose parts in place, the said fast wheel and disk being secured against removal without violence.

In testimony whereof we affix our signatures in presence of two witnesses.

AUGUST LEONHARDT. [L. S.]
LOUIS BÖNNINGER. [L. S.]

Witnesses:
  HELEN NUFER,
  ALBERT NUFER.